Jan. 9, 1962    R. L. FRANK    3,016,533
NAVIGATION COMPUTER
Filed March 22, 1951    6 Sheets-Sheet 1

INVENTOR
ROBERT L. FRANK
BY Paul B. Hunter
ATTORNEY

Jan. 9, 1962 R. L. FRANK 3,016,533
NAVIGATION COMPUTER
Filed March 22, 1951 6 Sheets-Sheet 2

INVENTOR
ROBERT L. FRANK
BY
Paul B. Hunter
ATTORNEY

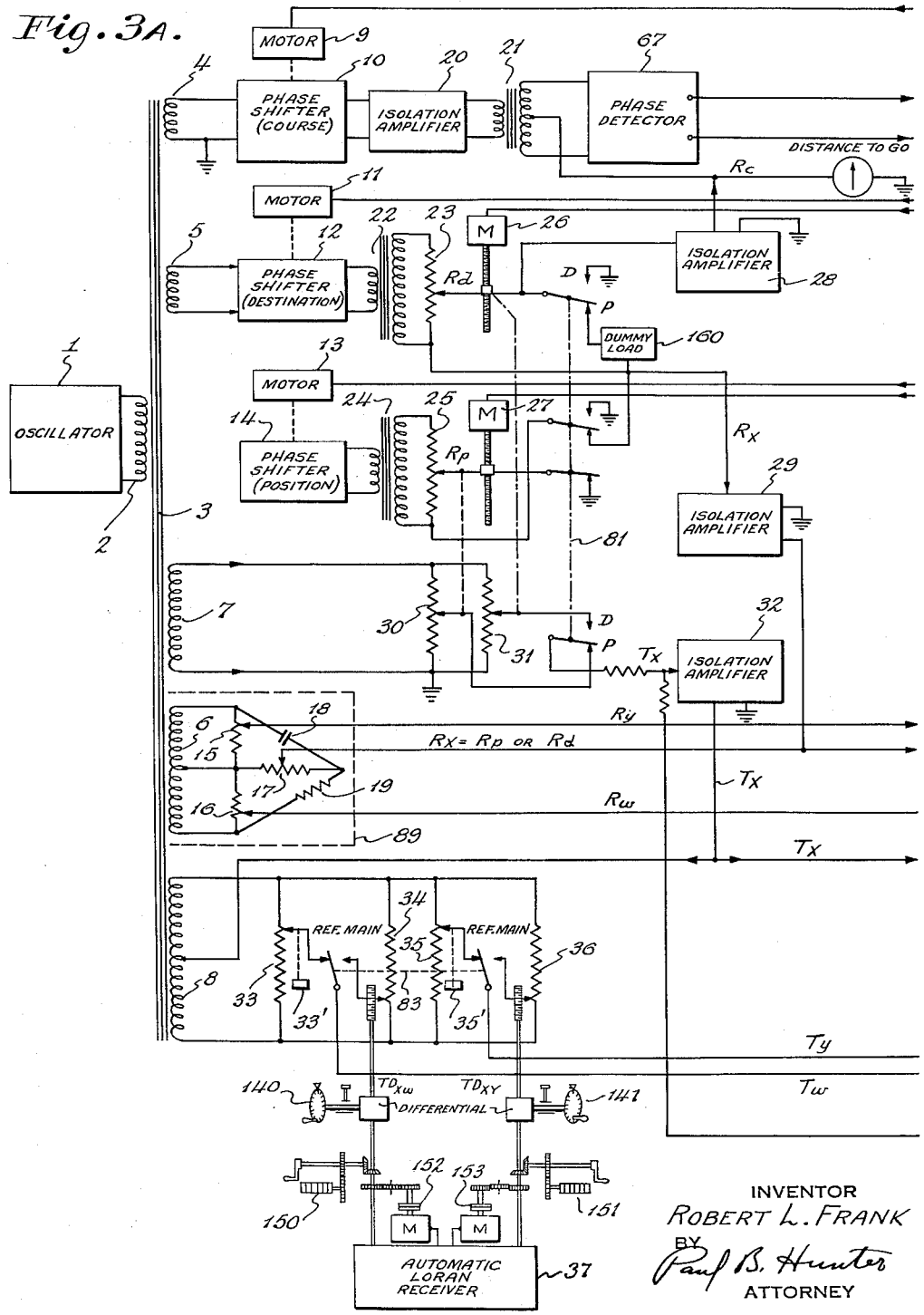

Jan. 9, 1962 R. L. FRANK 3,016,533
NAVIGATION COMPUTER
Filed March 22, 1951 6 Sheets-Sheet 5

INVENTOR
ROBERT L. FRANK
BY
Paul B. Hunter
ATTORNEY

INVENTOR
ROBERT L. FRANK
BY
Paul B. Hunter
ATTORNEY

United States Patent Office
3,016,533
Patented Jan. 9, 1962

3,016,533
NAVIGATION COMPUTER
Robert L. Frank, New York, N.Y., assignor to Sperry Rand Corporation, a corporation of Delaware
Filed Mar. 22, 1951, Ser. No. 216,893
31 Claims. (Cl. 343—103)

The present invention relates to radio navigation and more particularly to navigation computing means for use with radio navigation systems, such as Loran.

The principles of Loran are well known and are disclosed in the November and December 1945 issues of "Electronics Magazine," and will be described herein. The basic idea of establishing the center Loran station as the origin of a polar coordinate system was suggested by E. C. Streeter in U.S. Patent 2,472,129. It was improved upon by W. Palmer, by the use of electrical vectors to represent distance and direction in application Serial No. 658,427, filed March 30, 1946 entitled, "A Navigation Computer and Piloting System, now Patent No. 2,581,438, both of which are assigned to the present assignee.

The present invention is an improved system in which is inserted the destination Loran coordinates and which converges to a null solution so that most sources of equipment error tend to cancel out or at most put curvatures into the path. Also, the present invention uses the sum and difference of the time differences to control the servo amplifiers in a new and improved mode of operation. These and other advantages of this system will be more fully discussed hereafter.

Since the present system utilizes the vector properties of alternating voltages, it is simpler, and more certain than a system that operates on a rectangular coordinate basis, which necessitates resolving voltages into quadrature components extremely accurately, and with sufficient stability. A rectangular system requires double the number of voltages that the present system requires and would also call for a mechanical or electrical means of converting shaft rotations into sines and cosines of the angles of rotation.

A primary object of the present invention is to provide new and improved navigation means.

Another object of the present invention is to provide new and improved automatic radio navigation means.

Another object of the present invention is to provide a new and improved automatic Loran navigator.

Another object of the present invention is to provide a new and improved automatic navigation system utilizing hyperbolic data.

Another object of the present invention is to provide a new and improved computer for navigation problems.

Another object of the invention is to construct an alternating current vector analogue hyperbolic computer which reduces the operation of measuring voltage amplitudes to the comparison of pairs of voltages, and avoid all mechanical limitations such as shaft rotation error.

Another object of the present invention is to provide new and improved automatic craft navigation means having present position and destination inputs in navigational system coordinates and adapted to guide the craft so as to converge the present position and destination to a null.

Another object of the present invention is to provide new and improved automatic hyperbolic navigation means having present position and destination inputs in hyperbolic coordinates and adapted to guide craft along substantially a great circle course to said destination.

Another object of the present invention is to provide new and improved automatic hyperbolic navigation means having present position and destination inputs in hyperbolic coordinates and adapted to provide information as to deviation from a predetermined course and distance from a predetermined destination.

Another object of the present invention is to provide a new and improved craft automatic hyperbolic navigator and automatic pilot responsive thereto to guide the craft along a predetermined course.

These and other objects become apparent from the following specification and figures of which, FIG. 1 is a vector diagram illustrative of the principles of operation;

FIG. 2 is a block diagram of an embodiment of the invention;

FIGS. 3a and 3b are schematic diagrams illustrative of an embodiment of the invention;

The general principles of operation of hyperbolic navigation systems like Loran may serve as an introduction to the present invention. A Loran "pair" of transmitting stations consists of two separate fixed ground stations each of which transmits signals in a definite time relation with respect to the other. The locus of points of constant elapsed transmission time intervals between them defines a hyperbola with the stations at the foci.

The "master" station of a Loran pair transmits signal pulses at a repetition rate which is characteristic of the particular pair. Pulses from the master station are received at the craft after an interval representing the time taken for the transmission to travel the distance from master station to craft. Pulses from the master station are also received at the "slave" station after some other interval which is characteristic of a given pair of stations and is proportional to the base line used (distance from master to slave). These received pulses cause the slave station to transmit pulses of its own at the same repetition rate. A fixed delay time is introduced at the slave station between received and transmitted pulses, for reasons which will be explained hereinafter. The slave transmission is thus synchronized with, or locked to, the master transmission. This is the significance of the terms "master" and "slave." Pulses from the slave station arrive at the craft after a time interval representing the distance from slave to craft. The craft, therefore, receives two series of pulses, one from master and one from slave. The time interval between the arrival of master and slave pulses is measured at the craft by means of the indicator on which the received pulses, and also suitable time-marker pips, are displayed. It will be seen that the time delay between received master and slave pulses may be located on a chart having hyperbolic lines of position each representing a locus of points having a constant time difference with respect to one pair of Loran stations and that two intersecting lines (obtained from different Loran pairs) yield a fix.

The present computer is essentially a homing device, giving continuous guidance between initial position and destination along a great circle course. The input information may comprise, transmitter positions given in rectangular coordinates with one base line on a reference axis, position of destination, and continuous present position of the craft, both latter given in the navigational system coordinates. The outputs of the computer are a signal proportional to the deviation from the desired great circle course, used to correct the course of the craft, and a signal approximately proportional to the distance to the destination, which may be used to initiate some set procedure when a specified distance to travel remains.

Figure 1:
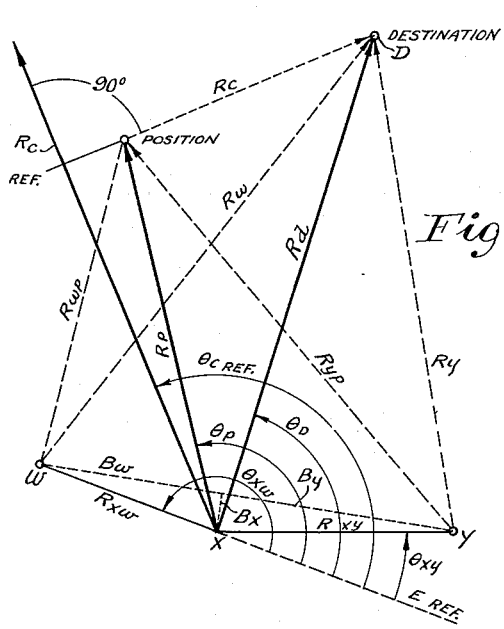

The computer obtains the solution for the course and distance to destination vectorially, utilizing the vector qualities of alternating voltages to represent vectors from one point to another. The distances and angles between points are represented by voltage magnitudes proportional to the distance, and relative phase equal to the angular displacement. The vector problem in a hyperbolic navigational system is illustrated in FIG. 1 with the solid lines representing vectors physically generated by phase shifters, and attenuators, and the dotted lines, vectors obtained by vectorial addition of the solid line vectors. The present invention, however, lends itself to employment equally as well with other navigational system, such as Shoran or those utilizing $R-\theta$ types of positional data.

The vector problem to be computed in connection with a hyperbolic navigational system will now be discussed. Referring to FIG. 1, two voltages $R_{XW}$ and $R_{XY}$ are established at bearing angles $\theta_{xw}$ and $\theta_{xy}$ from the reference axis $E_{Ref}$. The length of these vectors and the angle between them is made proportional to the length of the Loran transmitter station base lines and the angle between them. X is the central reference station, and in the usual case, the master station. Y and W are exterior and in the usual case, slave stations, although such master and slave relation is not essential to the operation of the computer.

A vector $R_d$ is established representing the distance and direction of the destination from the master or X station. The difference between $R_d$ and $R_{xw}$ produces vector $R_w$ representing the distance from the W station to the destination, and the difference between $R_d$ and $R_{xy}$ forms $R_y$ representing the distance of the destination from the Y station. If now each of the vectors $R_w$, $R_d$, and $R_y$ are separately rectified, voltages will be obtained proportional to the distances of the destination from each of the stations. The difference between the rectified voltages representing $R_d$ and $R_w$ will produce a voltage proportional to one time difference and the difference between the voltages representing $R_d$ and $R_y$ will produce a voltage proportional to the difference in distances from the master and other slave stations. These differences correspond to the Loran time differences, i.e. hyperbolic coordinates. Signals representing $R-\theta$ and other conventional types of positional data may be generated and employed in a similar manner.

The discussion just concluded assumes that $R_d$, that is, the distance and direction vector from the master station to the destination, is known. In this computer, only the destination Loran coordinates need be known, and $R_d$ is computed. To do so, the computed time difference voltages are compared with D.-C. voltages, representing the known Loran coordinates, generated by potentiometers on the time difference output shafts of an automatic-tracking Loran set. The errors between the computed D.-C. voltages and the D.-C. voltages representing the measured time differences are utilized to operate servo motors controlling the amplitude and phase of $R_d$, and in this manner, establish $R_d$ at the correct value.

In a similar manner if the time difference dials of the automatic Loran set are turned to time differences representing the craft present position, vector $R_p$ representing the distance and direction of the present position from the master station can also be generated.

$R_c$, which is the vector difference between $R_p$ and $R_d$, represents a straight line course from the present position to the desired destination. A course-reference voltage $R_{cRef}$ can be generated and adjusted to phase quadrature or other arbitrary relation with $R_c$. If now the craft's heading at its present position is directed toward the destination so that the angle of $R_c$ with respect to the course reference voltage remains constant, a straight line course will be described.

A simplified block diagram of the computer is shown in FIG. 2. Sine wave oscillator 108, which may be 1 kc. in frequency, is the source of all vector voltages utilized in the computer. This voltage is connected through phase shifter 102 to form the course reference voltage, through phase shifter 103 and potentiometer 112 to form the $R_p$ vector voltage, through phase shifter 107 and potentiometer 116 to form the $R_d$ vector voltage, through phase and amplitude control networks 109 and 110 to form $R_{xw}$ and $R_{xy}$, the station base line vector voltages. The oscillator 108 voltage is also connected to rectifier 111 to produce D.-C. voltages for potentiometers 131 and 133 connected to the output time delay shafts of the automatic Loran receiver 37.

The solution of the problem is obtained by the following tabulated steps, the apparatus for which is more fully discussed following the tabulation.

*Destination computation*

(1) Station vectors $R_{xw}$ and $R_{xy}$ are set up according to given information of the station positions.

(2) Hyperbolic coordinates (time differences) of the destination D are inserted as $TD_{xy}$ and $TD_{xw}$.

(3) Trial vector $R_d$ is set into computer as the vector remaining from previous use, or an assumed approximate solution is inserted by hand.

(4) Vector $R_Y$ is obtained by algebraically adding $R_{xy}$ and $R_d$.

(5) Vector $R_W$ is obtained by algebraically adding $R_{xw}$ and $R_d$.

(6) The scalar magnitudes of $R_d$, $R_Y$, and $R_W$ are obtained by rectifiers, and the magnitude or $R_d$ is subtracted from the magnitudes of $R_Y$ and $R_W$ to obtain the time differences $TD_{XY}$ and $TD_{XW}$ for the destination represented by the assumed vector $R_d$.

(7) The computed destination time difference coordinates are compared to the correct destination coordinates, inserted in step 2, to obtain the time difference errors.

(8) A servo system, having the time difference errors as an input corrects the vector $R_d$ till the errors are zero.

*Present position computation*

(9) The hyperbolic coordinates of the present position are set in by the automatic Loran receiver, and steps 3 to 8 are repeated for the position vector $R_p$.

*Course computation*

(10) Vector $R_c$ is obtained by subtraction of vector $R_p$ from $R_d$.

(11) The magnitude of $R_c$ is given continuously as the distance to go.

(12) $R_c$ is continuously compared in phase with $R_c$ reference to give the indication of deviation from the desired course.

(13) The deviation from course output is fed to an auto-pilot operated to reduce the deviation to zero.

The solution has been obtained in a plane, which is a projection of the earth's surface, transformed by location of points according to the oblate spheroidal hyperbolic coordinates on the earth. Each point is transferred to the plane to a position having the same hyperbolic coordinates, in a plane system having the same station separations as the arc separations of the stations on the earth. This type of projection has been found by applicant, by actual plotting, to correspond closely to a gnomonic projection for most station configurations. The gnomonic projection plane is located so that the stations project on the plane with separations equalling the arc separations on the earth. A gnomonic projection is one in which points are projected by passing a radius from the center of the earth through the point and using the intersection of the radius with the plane as the transformed point. Due to this projection system, all great circles project as straight lines. Therefore, if the craft is guided so that the phase of $R_c$ remains constant, it will follow a straight line in the plane which will project as nearly great circle on the earth.

Referring to FIG. 2, in the initial $R_d$ computation stage of operation, potentiometers 131 and 133 are set to known time differences corresponding to those of the desired destination by calibrated input knobs 131' and 133'. Veeder Root type counters 150 and 151 may be used to conveniently indicate the Loran time interval.

In conventional Loran practice the slave station does not pulse simultaneously with the master station but is delayed by the use of a coding delay. In the computer, zero time difference is represented along the center line between the stations, but in the actual Loran system the above predetermined time difference exists along the center line; therefore, the shafts of the potentiometers may be offset from the shafts of the automatic Loran sets by differentially geared input calibrated knobs 140 and 141. This adjustment may be termed a coding adjustment, and the shafts of knobs 140 and 141 are adapted to be locked by their associated clamps. The potentiometer shafts are disengageably connected to automatic Loran receiver servo motors 155 and 156 through slip clutches 152 and 153.

All switches 105, 114, 117 labeled P—D are first thrown to the position D (meaning "destination"). The difference between $R_d$ and $R_{xw}$ is taken in difference circuit 120 to form $R_w$. The difference between $R_d$ and $R_{xy}$ is taken in circuit 121 to form $R_y$. $R_w$, $R_x$, and $R_y$ are rectified in rectifiers 122, 123 and 124 to produce D.-C. voltages proportional to the magnitude of their alternating current voltages. $R_x$ is used in this discussion as a generalized term including either $R_d$ or $R_p$, depending on the position of the P—D switches. The difference between the $/R_x/$ and $/R_w/$ scalar voltages is taken in circuit 128 to form a voltage proportional to the computed time difference $TD_{xw}$. The difference between voltage $/R_x/$ and $/R_y/$ is taken in circuit 129 to form a voltage proportional to the computed time difference $TD_{xy}$.

The computed time difference voltages from difference circuits 128 and 129, and voltages representing the known Loran time differences of the destination, as established on potentiometers 131 and 133, are compared in the circuits 130 and 132. The sum of the errors between the computed and the established time differences is taken in circuit 138, amplified in servo amplifier 134 and connected to motor 115 operating potentiometer 116. The difference in the errors between the computed and established time differences is taken in circuit 137, amplified in servo amplifier 135 and utilized to control servo motor 106 which turns phase shifter 107. The servo motors turn until the computed and established time differences are the same. $R_d$ then accurately represents the vector from the station X to the destination.

$R_d$ is kept in storage for future reference and switches 105, 114, 117 are turned to the position marked P (indicating present position). The automatic Loran receiver 37 motor driven output, connected through slip clutches 152 and 153, turns potentiometers 131 and 133 to produce voltages representative of the time differences of the present position. Therefore, present position Loran coordinates will be indicated on indicators 150 and 151. Only the motor driven output shafts and indicators of the automatic Loran receiver are separately shown.

The slip clutches 152 and 153 are utilized to permit data input by way of knobs 131' and 133' and avoids the necessity of denergizing the motors 155 and 156 when doing so.

The automatic Loran receiver may be of the type disclosed in Palmer application Serial No. 80,249, filed March 8, 1949, now Patent No. 2,782,413, entitled "Automatic Loran Receiver." Alternatively, present position Loran data could also be manually inserted by means of knobs 131' and 133' and a manual visual Loran receiver could be used.

In switch position P phase shifter 103 and potentiometer 112 are now connected in the circuit in lieu of phase shifter 107 and potentiometer 116. All the rest of the circuit operates as described above, and servo amplifiers 134 and 135 control motors 104 and 113 to adjust $R_p$ to represent the distance and direction from the X station to the present position.

The difference between $R_p$ and $R_d$ is taken in difference circuit 119 and applied to phase detector 125, which also has applied to it course reference voltage $R_{cRef}$ from phase shifter 102. Switch 138' is first turned to "set," and motor 102' turns phase shifter 102 until the output of the phase detector 125 is zero. Switch 138 is then thrown to "fly" to actuate automatic pilot 96. Meter 126 indicates deviations from the desired straight line course. The automatic pilot may be a commercially available type, such as Model A–12 of Sperry Gyroscope Company, or equivalent. The distance from the present position to the destination is indicated by the magnitude of the voltage $R_c$ from circuit 119 as read on voltmeter 127.

Figure 3B:
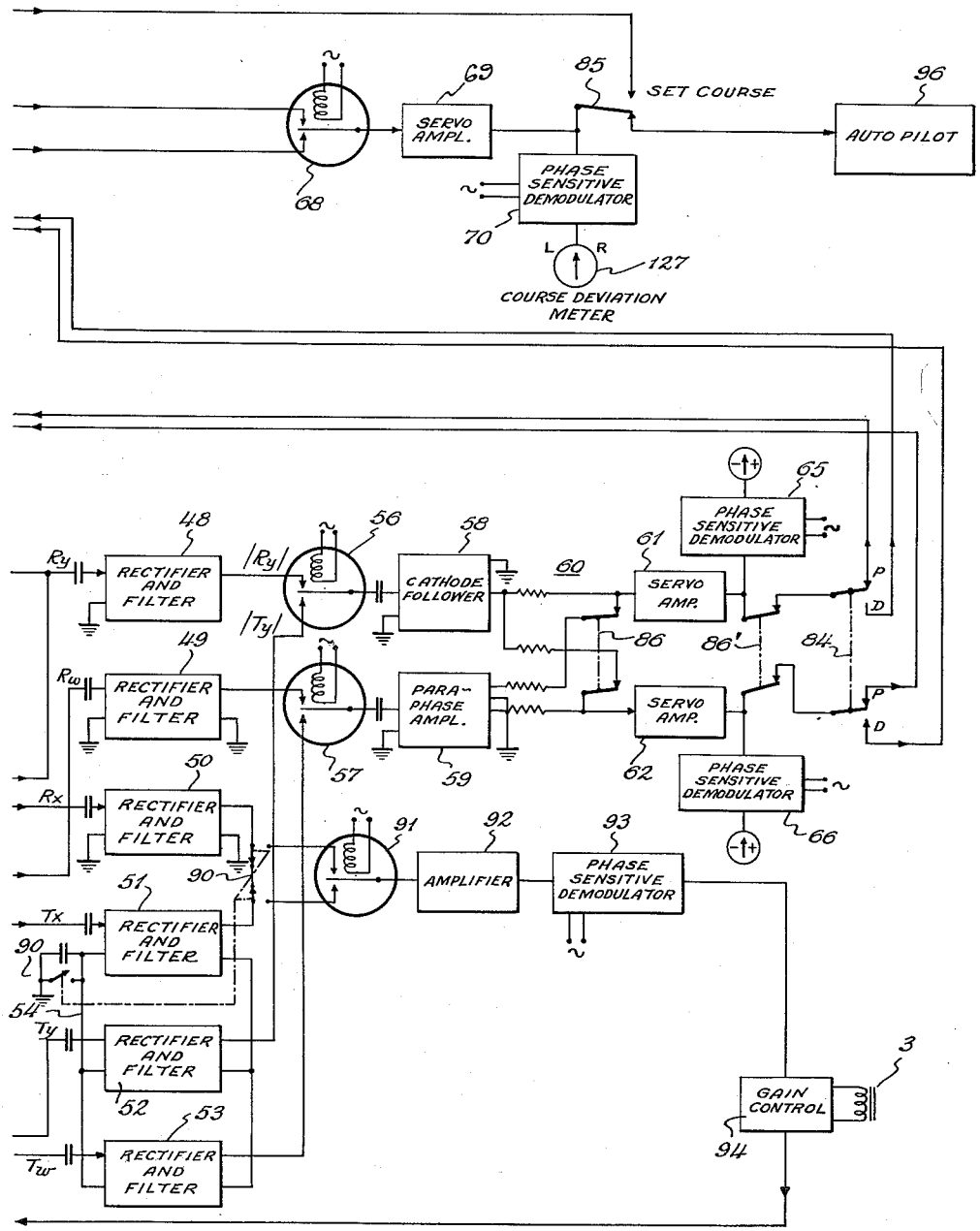

In the schematic diagrams of FIGS. 3a and 3b a number of additional apparatus refinements are shown to insure accuracy of operation in the computer although the system is basically the same as that of FIG. 2. All voltages for operation of the computer are taken from secondaries 4, 5, 6, 7 and 8 of one transformer 3, which is connected by winding 2 to 1 kc. cycle oscillator 1. The course voltage $R_c$ which is the difference between $R_d$ and $R_p$, is obtained by connecting $R_p$ and $R_d$ in series opposition with aid of isolation transformer 22. A similar isolation transformer 24 and dummy load 160 is provided in the $R_p$ path so that distortion of the two voltages will be balanced.

$R_p$ and $R_d$ are computed in sequence by switching in paralleled circuits by switch 81 in the same manner as discussed in connection with FIG. 2.

The station base vector components of FIG. 1 are generated in network 15, 16, 17, 18 and 19, connected to winding 6 of the transformer 3. The rectangular components $B_y$ and $B_w$ of the base lines along a line through station Y and station W are established on potentiometers 15 and 16. The component $B_x$ of the base lines representing the quadrature offset of the X station from the line between the Y and W stations is established in phase quadrature with the voltage across potentiometers 15 and 16 by means of network 18 and 19. $R_x$ is inserted on potentiometer 17 and the vector differences $R_w$ and $R_y$ between the $R_x$ input and the station base line voltages is obtained by series voltage subtraction.

More specifically, the vector $R_{xy}$ is obtained by the vector addition of its rectangular components represented by voltages $B_y$ and $B_x$ respectively, FIG. 1. A loaded $R_c$ network across a balanced voltage source is used to obtain the quadrature voltage $B_x$, whose magnitude is varied by varying the tap distance from the transformer center tap on the $B_x$ potentiometer 17. The vector component additions of $B_x$, $B_y$ and $R_{xw}$ indicated in FIGURE 1 is performed by connecting $R_x$ input to the $B_x$ potentiometer 17 tap. $R_x$ is obtained from a low impedance source, so the voltage is not affected by the remainder of the circuit. To represent the circuit as seen at the input to $R_y$ detector 48, FIGURE 3, Thevenin's theorem may be used, and is represented as an equivalent voltage source and a series impedance with $R_y$ detector 48 as its load. The voltage is equal to the voltage at the input with no load. Since the only ground connections of the network are through the $R_y$ detector, and through the source 29 of $R_x$, if the detector input is open circuited, no current can flow through the $R_x$ source. Since this is true, the equivalent Thevenin's voltage is equal to voltage $R_x$ plus a voltage independent of the voltage $R_x$. The equivalent Thevenin impedance is equal to the impedance at the detector input with the voltage sources shorted, so this, too, is independent of $R_x$. The detector 48 input voltage, then, is $R_x - B_x - B_y = R_y$ in series with the equivalent impedance.

Isolation amplifiers 28, 29 and 32 are included at points where a low output impedance is necessary to provide accurate series addition or subtraction of voltages. To minimize errors caused by nonlinear operation of rectifiers and to permit the potentiometers 34 and 36, connected to the automatic Loran receiver 37, to operate at a relatively low impedance with respect to ground, the D.-C. voltages representing the time difference indication of the automatic Loran receiver are obtained by a rectifier network similar to that used for obtaining the voltages representing the computed time differences.

Potentiometer 30 is ganged with potentiometer 25 and provided with a similar amplitude voltage from winding 7, and potentiometer 31 is ganged with potentiometer 23. Therefore the voltage out of the $T_x$ isolation amplifier 32 is approximately the same amplitude as that of $R_x$ isolation amplifier 29 (but not necessarily the same phase). $T_x$ is used as a generic term like $R_x$, to include $T_p$ and $T_d$. This makes those voltages applied to rectifiers 48 and 52 nearly equal, those applied to 49 and 53 nearly equal, and those applied to 50 and 51 nearly equal. This also tends to make non-linearities in the rectifiers cancel out.

Potentiometers 34 and 36 are excited with alternating voltages from winding 8 and the alternating voltage from potentiometers 30 and 31 is connected to the center tap of winding 8. Thus when the slider on potentiometer 34 or 36 is at the mid-point, the voltage will be the same as $T_x$ and as the potentiometer slider moves, the voltage at the slider will be more or less than $T_x$ by an amount $TD_{xw}$ proportional to the displacement of the potentiometer from the central position which is effected by automatic Loran receivers 37. The difference in the magnitudes of the $T_x$ voltage and the $T_y$ or $T_w$ voltages on the tap of potentiometer 34 or 36 is proportional to the displacement of the tap from the mid-point, and is plus or minus depending on the direction of displacement. This difference in magnitude corresponds to the Loran coordinates.

The voltages $T_x$, $T_y$, and $T_w$ are rectified individually in rectifiers and filters 51, 52, and 53. The low potential end of each rectifier circuit are tied together by bus 54, so that the difference between the high potential output of rectifiers 51 and 52 is a voltage proportional to the $TD_{XY}$ time difference and the difference between the high potential outputs of rectifiers 52 and 53 is proportional to the $TD_{XW}$ time difference. When the computer has solved $R_x$ (either $R_p$ or $R_d$), $/T_x/$ will be approximately equal to $/R_x/$ from rectifier 50, $/T_y/$ will be approximately equal to $/R_y/$ and $T_w/$ will be approximately equal to $/R_w/$, from rectifier 49.

The computed scalar quantity $/R_y/$ appears on one stationary contact of vibrator 56, and its corresponding value $/T_y/$ on the other stationary contact. Since $/R_y/$ should equal $/T_y/$ the input to this vibrator will be the error between them. Vibrators 56 and 57 convert the D.-C. error into an A.-C. error signal with a phase depending on the polarity of error. The output of vibrators 56 and 57 are connected to cathode follower 58, and para-phase amplifier 59.

The para-phase amplifier 59 produces two voltages equal and opposite in phase and proportional in amplitude to the error in time difference appearing in vibrator 57. The sums and differences of the errors from cathode follower 58 and para-phase amplifier 59 are taken in network 60, amplified in servo amplifiers 61, 62 and applied to the phase servo motors 11 and 13, and amplitude servo motors 26 and 27 as indicated. Amplitude motors 26 and 27 are mechanically linked to the wiper arms of potentiometers 23 and 25 by their threaded output shafts to move the potentiometer arms up and down. Phase servo motors 11 and 13 actuate phase shifters 12 and 14.

Figure 4:
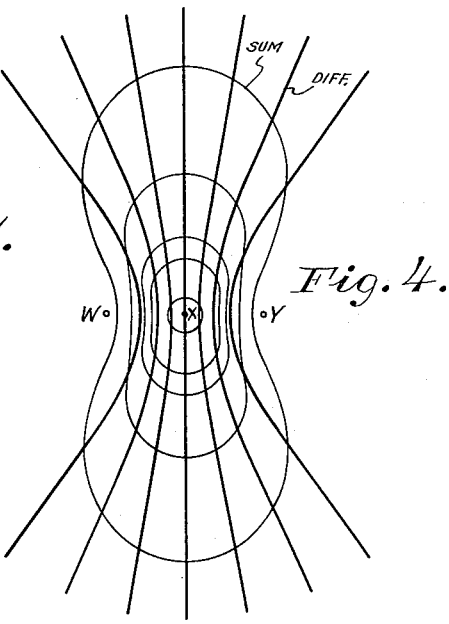
FIG. 4 is a graph of the sum and difference values of time difference plotted for a group of three stations.

The advantage of the use of the sum and differences of the errors between computed and measured time differences to control the phase and amplitude servo motors can be explained by reference to FIG. 4, illustrating plotted curves of constant sum of the time differences from two pairs of stations, and curves of constant difference of time difference from two pairs of stations. It will be seen that in the areas where the Loran system produces good accuracy, the curves of constant sum are generally circular with the master or central station as a center, and the lines of constant difference of time difference are essentially radial from the central station. The intersecting angles are much greater than those of intersecting hyperbolas in the same area. This increases the system accuracy and greatly aids the converging characteristics of the computer toward a proper solution.

The primary advantage of taking the sum and difference of errors is that the errors in the sum values are corrected by changing the length of the assumed vector, and the errors in the difference values are corrected by changing the phase angle of the assumed vector. Both of these operations are performed by separate servo systems and therefore reduce the interaction between the servo systems.

The sum and difference values are not always the optimum values. When the station base lines are equal, the sum and difference values are the optimum values since in that case the sum values are substantially circular and the difference values are substantially radial. However, where the station base lines are not equal, this will not necessarily be the case and the desired circular and radial configuration may be obtained with another set of values for instance, the sum and twice the difference (S and 2D).

If switch 86 is disconnected the sum and difference will not be taken and one error from cathode follower 58 will regulate the amplitude of the assumed vector, and the other error from amplifier 59 will regulate the phase of the assumed vector. This is an alternate mode of operation.

The output of the phase detector 67 is a D.-C. voltage proportional to error from phase quadrature of the $R_c$ voltage and the course reference voltage $R_{cRef}$ from isolation amplifier 20. This error voltage is converted into an A.-C. reversible phase or polarity error signal by vibrator, chopper 68, amplified by servo amplifier 69, and applied to motor 9 for controlling phase shifter 10.

Phase sensitive demodulator 70 energizes meter 127 to indicate course deviation.

The motors 9, 11 and 13 may be two-phase induction motors with an excitation in phase quadrature from the error voltage from the servo amplifier, therefore phase reversal of the error voltage from the servo amplifier will control the direction of rotation of the servo motors.

In addition to the main potentiometers 34 and 36 attached to the time delay shafts of the automatic Loran receiver 37 two reference potentiometers 33 and 35 are provided. In the initial stage of setting up the destination vector $R_d$ switch 83 is first turned to position "Main" while switches 81 and 84 are turned to position D. Thus, the destination vector is established in terms of a particular point of setting on the actual potentiometers connected to the delay shaft of the automatic Loran set, and arrival at destination will be indicated by return of the contacts on these potentiometers to the identical point.

After the potentiometers and destination vector have been established, switch 86 and 86' are turned downward, removing excitation from all servo motors, and connecting phase sensitive demodulator 65 to read the error in one time difference only, and phase sensitive demodulator 66 to read the error in the other time difference only. Switch 83 is thrown to "Ref" position and potentiometers 33 and 35 are manually adjusted by knobs 33' and 35' until the error as read on meters 65 and 66 is zero. The voltage at the tap of potentiometer 33 is thus established as the same as that on the tap of potentiometer 34, and the voltage at the tap of potentiometer 35 is the same as that at the tap of potentiometer 36. Thus, the time differences Loran coordinates representing R, are stored in potentiometers 33 and 35.

Now at any time during operation of the equipment, switches 81, 83 and 84 may be temporarily returned to "Ref" or D position, as the case may be, and if there has been any drift in the voltage produced by phase shifter 12 or potentiometer 23 or in the voltage produced by the station base network 15 to 19 or any drift in the characteristics of rectifiers 48 through 53, a slightly new destination vector $R_d$ will be computed which represents the vector corresponding to the voltages that will exist on potentiometers 34 and 36 at the destination with the drift in the components just mentioned taken into account. Thus, any drift will not affect accurate arrival at the destination, provided periodic resetting of the destination vector $R_d$ is made in the manner just described. After $R_d$ has been readjusted, switch 85 can be temporarily thrown to position "set course" to recompute a slightly different course $R_c$, if necessary to compensate for drift in components.

The circuit has been so arranged that the need for isolation amplifiers has been reduced to a minimum. This was accomplished by grading the impedances from a low impedance to a high impedance as the circuit proceeds from left to right on the diagram. The rectifiers are preferably relatively high impedance and in order to prevent changes in components due to changes in humidity they may be hermetically sealed in any production equipment. The circuit is preferably so arranged that components which require access in operation of the equipment are not included in the parts which may be hermetically sealed.

A further modification or refinement of the invention may be made to improve the accuracy of its operation by placing switch 90 in its downward position. This will ground the bus 54 and switch in the chopper 91 to compare the outputs of rectifiers 50 and 51. The output of chopper 91 is amplified in amplifier 92 and detected in demodulator 93, the output of which actuates gain control circuit 94 to add a correction to the $T_x$ quantity supplied to isolation amplifier 32. The voltage to be controlled in the gain control circuit 94 may be obtained from a separate winding of the transformer 3. In this way the $T_x$ signal can be equal in amplitude to the $R_x$ signal value as closely as desired. With this modification, all alternating current voltages are compared in amplitude in pairs, and errors due to rectifier non-linearity can be made to cancel completely. Furthermore, the need for isolating the low end of any of the rectifiers from ground is obviated. Each pair of rectifiers and chopper can be hermetically sealed in an individual unit to prevent leakage due to excess humidity or other undesirable conditions.

Changes in the level of the output of oscillator 1 will affect all portions of the circuit proportionally and the only effect upon accuracy of the equipment will be error in the distance-to-go indication proportional to this change in level. Rectifier circuits are all arranged in pairs, bucking, so that the contact potential in two rectifiers tend to oppose each other. Initial adjustment to compensate for any remaining unbalance may be made. Drifts in contact potential due to changes in line voltage will tend to cancel.

If the length of the station baseline or the angles are not correctly set on potentiometers 15, 16 or 17, the only effect, except very near the station baselines, will be a slight curvature in the path flown, but accurate arrival at the destination will still be obtained.

Nonlinearities in potentiometers 34 and 36 will introduce slight wiggles into the path followed but will not prevent accurate arrival at the destination. Since phase shifters 13 and 14 and potentiometers 23 and 25 are used only to establish the destination in position vectors, accurate calibration of these elements is not required, and slight amplitude modulation introduced by the phase shifters or the potentiometers will cause no difficulty. Likewise errors in phase shifter 10 will only cause slight errors in the directness of the course flown. If the various rectifiers 48, 49, 50, 51, 52 and 53 do not have identical conversion factors from A.-C. to D.-C., this again will produce slight curvatures in the course flown but not prevent accurate arrival at the destination.

Details of the system components will now be discussed.

Figure 5:
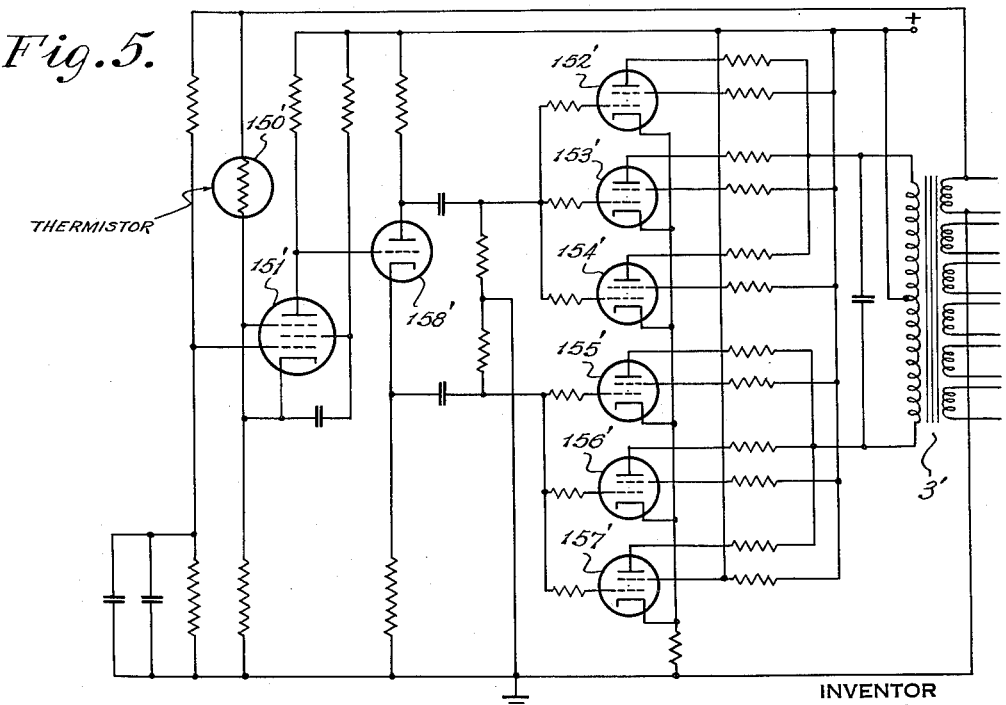
FIG. 5 is a schematic diagram of a preferred type of oscillator adapted to be used in the invention.

FIG. 5 illustrates a preferable form of oscillator 1. The oscillator, which may be 1 kc. in frequency, supplies, through a common transformer 3, the reference voltage to all other units. A preferable form of oscillator shown is a Wien bridge type oscillator using a pentode 151' for instance of the 6AU6 type, amplitude stabilized by the use of a thermistor 150' as the resistance in one arm of the frequency determining bridge. The oscillator has a balanced amplifier 158' connection to the output stage. By employing six 6AQ5 tubes 152' to 157' in push-pull for the output stage, and using degenerative feedback from the secondary side of the output transformer 138, 30 watts may be supplied to the system with less than .2% harmonic distortion. Other type stable oscillators may be used.

Figure 6:
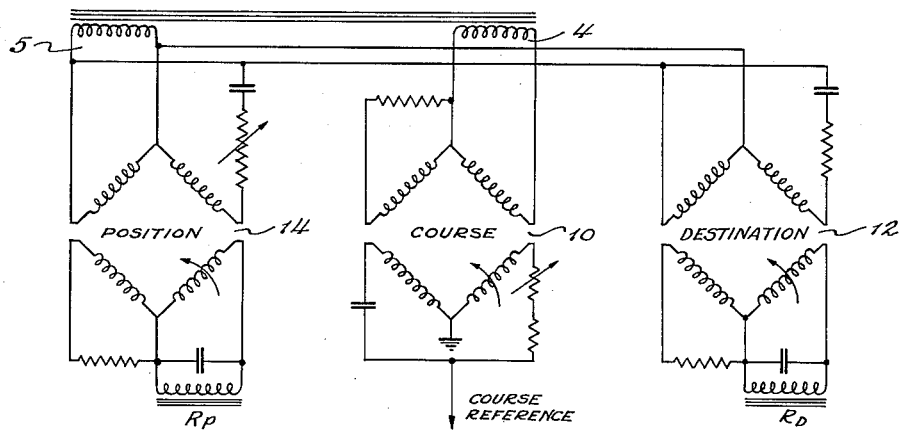
FIG. 6 is a schematic diagram of a preferred phase shifting arrangement for the invention.

FIG. 6 shows a preferable embodiment of phase shifters 10, 12 and 14. The phase shifters, shown in FIG. 6, provide the voltage $R_c$ reference, $R_p$ and $R_d$. These voltages have their phases varied by conventional two-phase synchro resolvers 10, 12 and 14 with the phase shift equal to the mechanical rotation of the rotor shaft. They are discussed in volume 19, page 497, of the M.I.T. Radiation Lab. Series, McGraw-Hill.

Referring to FIG. 3a, the output magnitudes $R_d$ and $R_p$ are varied for instance by linear resistor attenuators 23 and 25, which have increments of resistance small enough to maintain the desired voltage resolution of the system. When the system is operated to correct voltage $R_d$ to concur with the hyperbolic coordinates of the destination (switch position D), the output end of the $R_p$ potentiometer 25 is grounded, the variable tap of the $R_p$ potentiometer is open, the variable tap of the $R_d$ potentiometer is grounded, and the $R_d$ voltage is taken from one end of the potentiometer 23. In this mode of operation, the $R_x$ isolation amplifier 29 is a load across the $R_d$ potentiometer output.

When the computer is operated to compute the position and course vectors (switch position P), the $R_x$ isolation amplifier 29 is switched to the output end of the $R_p$ potentiometer 25 the center tap of which is grounded. Then, from ground at the center tap of potentiometer 25 we have the addition vectorially of $R_p$ and the negative of $R_d$ to form $R_c$, which is connected to its isolation amplifier 28 for further use without interaction on the previous networks. Since it is important that $R_d$ not change after it is computed, and since the loads on it are changed during the computation of $R_p$ and $R_c$, dummy load 160 is connected as a load on $R_d$ to maintain a constant total load impedance.

The potentiometers 23 and 25 are ganged to potentiometers 31 and 30 across reference voltage winding 7 to give the same magnitude (or slightly greater) voltages as $R_p$ and $R_d$. Their outputs are used so that all the processes of detection and subtraction to obtain $R_X$, $R_Y$ and $R_W$ are repeated at about the same voltage level with the time difference inputs from the hyperbolic system receiver, to reduce system non-linearities of detection, and to provide a convenient means of obtaining time difference error for the assumed $R_X$.

Figure 7:
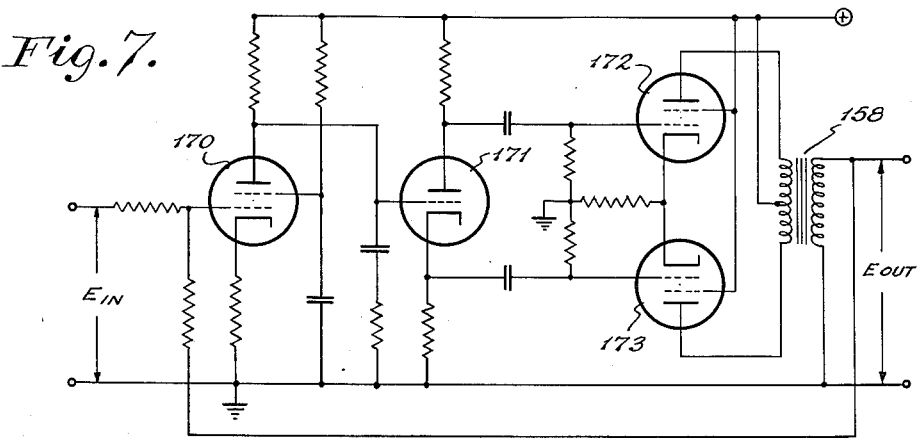
FIG. 7 is a schematic diagram of a preferred embodiment of an isolation amplifier for use in the invention.

FIG. 7 shows an embodiment of the isolation amplifiers 28, 29, and 32. All outputs of the phase shifters 10, 12 and 14 are preferably made through isolation amplifiers to isolate the effects of their loads from other parts of the system, and so that the output impedances of the voltages will be low to allow series addition of voltages with the source impedances contributing a negligible effect. A preferable amplifier is shown in FIGURE 7, and is an RC coupled amplifier with a push-pull transformer coupled output. The amplifier comprises two stages of amplification 170, 171 and a pair of output tubes 172, 173 in push-pull. The amplifier has internal gain of about 6,600, and utilizes negative feedback from the secondary side of the output transformer 158 to give an over-all gain of from 1 to 12.

Figure 8:
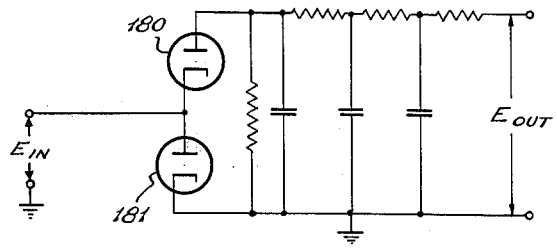
FIG. 8 is a schematic diagram of a preferred embodiment of a rectifier filter for use in the invention.

FIG. 8 shows an embodiment of the rectifier filters 48, 49, etc. The output voltages representing the assumed vectors from the stations to P (or D), and the assumed time separation of the stations and P (or D) are rectified in detectors 180 and 181 like that shown in FIGURE 8 to produce the time difference errors of the assumed position.

Figure 9:
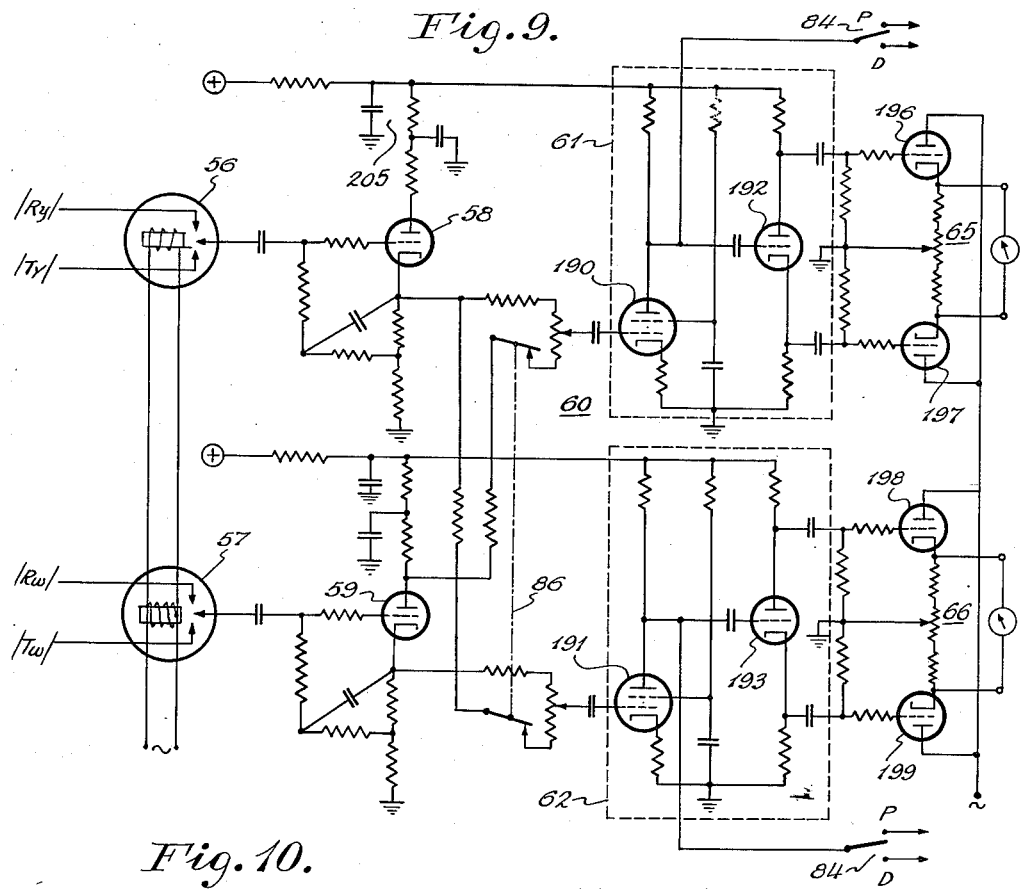
FIG. 9 is a schematic diagram of a preferred embodiment of a servo amplifier and associated circuits for use in the invention.

A typical embodiment of the circuit including the vibrators, and the sum and difference circuits is shown in FIG. 9. The voltage on the movable contact of vibrator 56 is a square wave whose magnitude is proportional to the time difference error between ($R_y$) and ($T_y$) and is connected to the grid of a paraphase amplifier 58 which has two outputs. The vibrator 56 is used to convert the D.C. error signal to an A.C. signal, which may be amplified stably, avoiding the instability of D.C. amplifiers whose "zero" level must remain fixed. The sign of the D.C. error is preserved by the phase relationship between the square wave and the alternating current supply, for instance 400 cycle, that drives the vibrator. The square wave is connected to a cathode follower stage 58 and to a paraphase amplifier 59 which provides two outputs 180° out of phase. Vibrator 57 performs a similar function.

The two outputs are combined to obtain the sum and difference of the error signals in network 60. The sum and difference quantities are applied separately to amplifiers 191 and 190. The amplifier output tubes 192, 193 supply a balanced output to the paired phase sensitive demodulator tubes 196, 197, 198, 199. This output is used to drive the grids of the phase sensitive demodulator tubes 196 to 199 with the square waves of opposite sign. The 400 cycle sinewave that drives the vibrator, is also supplied to the plates of the demodulator tubes. This sinewave is in phase with one of the grids of each pair, and out of phase with the other grid, with phase reversal of the grids taking place when the D.C. error signal changes sign. With balanced conditions, the square wave input to both tubes of each demodulator is of zero amplitude, so both conduct for the same length of time when their plates are positive, thereby insuring that their cathodes have the same average voltage. When the error square wave increases, one grid is more positive than the other during the conduction portion of the cycle. Therefore, one cathode becomes more positive than the other, and the output signal taken as the voltage between the two cathodes is a D.C. voltage, that is equal to the error D.C. input voltage amplified, maintaining the sign of the error. The error in the differences of time differences is used to correct the phase of $R_X$, and the error in the sums of time differences is used to correct the magnitude of $R_X$. The network 205 is a decoupling network.

The present system of correcting the $R_X$ vector may be shown to converge on the correct position for any point on the plane. However, there are two intersections of time difference hyperbolas, either of which the computer could accept as correct, unless instructed as to which side of the station bases the desired solution lies. This adjustment may be set in by means of the servo system used to correct the phase of $R_X$ by setting the direction of phase correction for positive time difference errors. Having the sensing of the phase servo system set, the computer will always seek out the solution on one side of the station bases. For the solution on the other side of the stations, the sensing must be reversed.

In case of a solution lying beyond the extreme radius of the computer, the phase servo sets in about the correct angle, and the magnitude servo runs out to its largest value and may be stopped by a limit switch.

Figure 10:
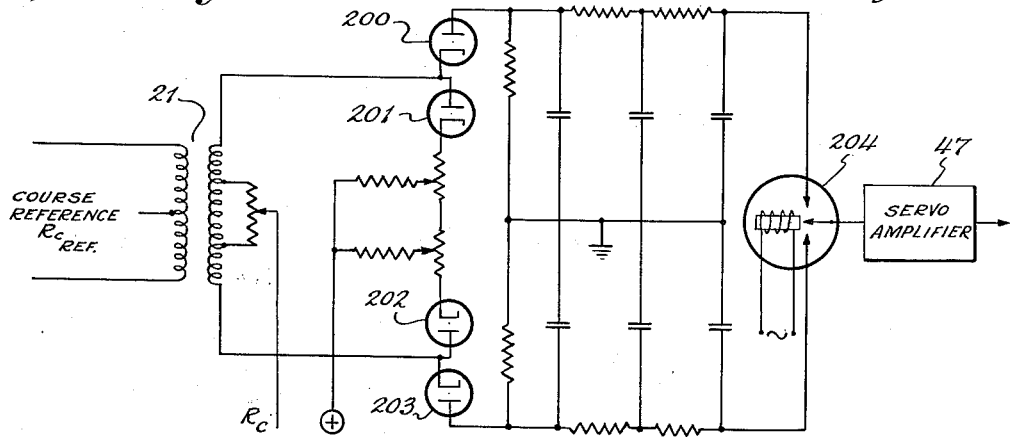
FIG. 10 is a schematic diagram of a preferred embodiment of a phase detector for use in the invention.

A schematic diagram of a preferable embodiment of a phase detector is shown in FIG. 10. One voltage representing $R_c$ is connected to the center tap of the secondary of the output transformer 21 of the course reference isolation amplifier 20. The balanced terminals of the secondary are the inputs to the phase detector. This phase detector consists of two detectors preferably using four diodes 200, 201, 202, 203, for instance type 6X4, to accommodate the large voltages encountered, and using a load configuration with voltage rather than current output. The outputs of the two detectors will differ by approximately the product of the phase difference between $R_C$ and $R_{Cref}$, as long as the latter remains large compared to $R_C$. The voltage representing $R_{Cref}$ is in quadrature with the representation of $R_{Cref}$ in FIG. 1, which merely illustrates an arbitrary reference. The outputs of the phase detectors are connected to the contacts of a vibrator 204. Therefore, the voltage applied by the movable contact to the servo amplifier 47 is a 400 cycle square wave whose amplitude is proportional to the distance and whose phase is proportional to the sense of deviation from the desired track. To insure that the error output will be zero at the destination, and all points along the desired track, the output transformer for $R_{Cref}$ must be accurately balanced. This is done by careful construction of two similar windings on a common core, and obtaining the center tap by applying $R_c$ to a variable tap on a resistor connected to points a few turns in from the common connection of both coils. Variations in the individual diodes may be balanced by the potentiometers in their cathode circuits.

The hyperbolic automatic navigator of the present invention, provides guidance along a straight line path from any position within the service area of two pairs of Loran stations, and to any desired destination within the service area within the same pairs of stations. The guidance information is in the form of left or right deviation from the straight line and distance-to-go to the destination. Applicant has determined by actual plotting that a computer which operates on a plane surface as does the present invention will compute a path on the surface of the earth which lies very close to a true great circle path, provided that the present position and destination are expressed in Loran time difference numbers.

One of the advantages of the present invention is that the destination is expressed in Loran hyperbolic coordinates (time difference numbers) and in that the destination is established as a null point upon which the sum and difference error computations converge. By this null method the number of precision components required is reduced and the effect of errors in a great many components is merely to put curvatures into the path rather than to prevent arrival at the desired destination.

In the present invention a philosophy of computer operation and design has been described for increasing, in a simple manner, the accuracy of navigational computers used with various types of guidance systems. The principle is applicable to celestial and inertial guidance data systems and to various electrical and mechanical instrumentations, as well as radio guidance. The principle embodies inserting the destination of target coordinates by means of the present position data inputs, then storing these coordinates on auxiliary components. The vehicle is then guided to the destination, and when present position inputs correspond to the previously inserted destination, the vehicle must be at the destination notwithstanding inherent errors in the computer, which are cancelled by the mode of introducing and the storing of the data. The destination data which is aimed at has been inserted through the same error-causing components as the present data, hence these errors cancel out.

Methods of computer construction and operation have been described whereby the non-conformity of computer elements with theoretical calibrations or mathematical laws will not prevent accurate arrival at a destination, provided that the repeatability of the components is sufficient. By repeatability is meant that a given input will always produce the same output. Errors in repeatability could be caused by such factors as backlash and changes in characteristics of components with temperature, humidity, aging, vibration and shock. Nevertheless, the requirement of accurate repeatability for a component is an order less stringent than a requirement of accurate conformity. Furthermore, means have been shown whereby the number of elements which require accurate long-term repeatability may be reduced to a minimum.

An important feature of the invention is the construction of an alternating current vector analogue computer which reduces the computation to the comparison of pairs of voltages, thereby greatly increasing the accuracy and stability obtainable by this general technique.

The present invention is not limited to use with the Loran system, but may be used wherever it is necessary to solve problems utilizing navigational system coordinates and also in the more general field of vector computation.

What is claimed is:

1. In a navigation computer, data input means, means for inserting destination position data into said data input means, means for storing said destination data, means for inserting present position data through said data input means, and alternating voltage vector computer means responsive to said data for converging said destination and present position data to a null.

2. In a hyperbolic coordinate computer having data input means, means for inserting destination position hyperbolic coordinates data through said data input means, means for storing said destination data, means for inserting present position hyperbolic coordinate data through said input channels, and alternating voltage vector computer means responsive to said input data for converging said destination and present position data to a null, to thereby substantially cancel equipment errors.

3. Alternating voltage generator means to create assumed vector voltage polar coordinate quantities, means to convert said polar coordinate voltages to hyperbolic coordinate voltages, means to compare said assumed hyperbolic coordinate quantities with known hyperbolic quantities and means connected to said comparison means to correct said polar coordinate quantity creating means.

4. Means to create quantities representing polar and hyperbolic coordinates, means to compare said polar and hyperbolic coordinate quantities including coordinate conversion means, and means responsive to the sum and difference of the error from said comparison means to correct said coordinate creating means.

5. In a navigation system of the type defining hyperbolic lines of position about several reference points, a computer comprising means for creating vector quantities proportional to the base lines of said points, first input means for setting into said computer hyperbolic coordinate signals of a desired destination, second input means for setting into said computer hyperbolic coordinate signals of the present position, and means responsive to said input means for converting said hyperbolic coordinate signals to polar coordinate signals including means responsive to the sum and difference of the hyperbolic coordinate error.

6. A hyperbolic coordinate computer comprising means for creating alternating voltage analogues of vector distances from predetermined reference stations to present craft position, means for establishing alternating voltage analogues of vector distance from predetermined reference stations to a desired destination, means responsive to said vectors to obtain their hyperbolic coordinate sum and difference quantities, means responsive to said sum and difference error signals for correcting said vector quantities, and means for comparing said present position and said destination vector quantities to thereby determine the course and distances to said destination.

7. A computer for a radio hyperbolic navigation system of the type having a plurality of separate transmitting stations comprising base line generator means to create voltages representing said station base line vectors, destination input means to insert hyperbolic coordinates of a desired destination, first vector generator means responsive to said base line generator and second input means to generate a destination vector voltage representing the direction and distance from one of said stations to said destination, second vector generator means responsive to said base line generator and second input means to generate a second vector voltage representing said destination direction and distance from a second of said stations, third vector generator means responsive to said base line generator and second input means to generate a third vector voltage representing direction and distance from a third of said stations to said destination, rectifier means responsive to said vector generator means to obtain scalar quantities from said three vector quantities, difference circuit means responsive to said rectifier means to obtain the differences between said first and second and said second and third scalar quantities, comparison means responsive to said difference circuit means and said input means to compare said differences with said inserted hyperbolic coordinates of said destination, and servo amplifier means responsive to said comparison means to correct said destination vector quantity.

8. A computer for a radio navigation system of the type having a plurality of separate transmitting stations comprising base line generator means to create voltages representing said station base line vectors, destination input means to insert coordinates of a desired destination, first vector generator means responsive to said base line generator and said input means to generate a destination vector voltage representing the direction and distance from one of said stations to said destination, second vector generator means responsive to said base line generator and said input means to generate a second vector voltage representing the direction and distance from a second of said stations, third vector generator means responsive to said base line generator and said input means to generate a third vector voltage representing the direction and distance from a third of said stations to said destination, rectifier means responsive to said vector generator means to obtain scalar quantities from said three vector quantities, difference circuit means responsive to said rectifier means to obtain the differences between said first and second and said second and third scalar quantities, comparison means responsive to said difference circuit means and said input means to compare said differences with said inserted coordinates of said destination, servo amplifier means responsive to said comparison means to correct said destination vector quantity, position input means to insert the coordinates of craft position, position vector generator means responsive to said position input means and said base line generator means to generate a position vector representing the direction and distance from said one station to said craft position, means responsive to said position vector generator and said destination vector generator to compare said corrected position vector and said corrected destination vector to thereby determine the direction and distance from said position to said destination.

9. A computer for a radio hyperbolic navigation system of the type having a plurality of separate transmitting stations comprising base line generator means to create voltages representing said station base line vectors, destination input means to insert hyperbolic coordinates of a desired destination, vector generator means responsive to said base line generator and said input means to generate destination vector voltages representing the direction and distance from said stations to said destination, rectifier means connected to said vector generator means to obtain scalar quantities from said three vector quantities, difference circuit means responsive to said rectifier means to obtain the differences between said first and second and said second and third scalar quantities, comparison means responsive to said difference circuit means and said input means to compare said differences with said inserted hyperbolic coordinates of said destination, means responsive to said comparison means to obtain the sum and difference of said comparisons, and servo amplifier means responsive to said sum and difference comparisons to correct said first vector quantity.

10. A computer for a radio hyperbolic navigation system of the type having a plurality of separate transmitting stations comprising base line generator means to create voltages representing said station base line vectors, destination input means to insert hyperbolic coordinates of a desired destination, vector generator means responsive to said base line generator and said input means to generate a destination vector voltage representing the direction and distance from said stations to said destination, rectifier means connected to said vector generator means to obtain scalar quantities from said three vector quantities, difference circuit means responsive to said rectifier means to obtain the differences between said first and second and said second and third scalar quantities, comparison means responsive to said difference circuit means and said input means to compare said differences with said inserted hyperbolic coordinates of said destination, means responsive to said comparison means to obtain the sum and difference of said comparisons, servo amplifier means responsive to said sum and difference comparisons to correct said first vector quantity, position input means to insert the hyperbolic coordinates of craft position, position vector generator means responsive to said position input means and said base line generator means to generate a position vector representing the direction and distance from said one station to said craft position, means responsive to said position and destination vector generators to compare said corrected position vector and said corrected destination vector to thereby determine the direction and distance from said position to said destination.

11. A Loran automatic navigator comprising base line generator means to create voltage inputs representing Loran station base line vectors, data input means to insert the hyperbolic coordinates of present position and desired destination, vector generator means to create assumed vector voltages representing the directions and distances from said Loran stations to said destination and said present position, means connected to said vector generators to compute the Loran coordinates of said vectors, servo means responsive to the sum and difference between said computed and said inserted Loran coordinates to correct said assumed vectors, and means to compare said position and destination vector voltages to determine course and distance from said present position to said destination.

12. A Loran automatic navigator comprising base line generator means to create voltage inputs representing Loran station base line vectors, data input means to insert the hyperbolic coordinates of present position and desired destination, vector generator means to create assumed vector voltages representing the directions and distances from said Loran stations to said destination and said present position, means responsive to said vector generators to compute the Loran coordinates of said vectors, servo means responsive to the sum and difference between said computed and said inserted Loran coordinates to correct said assumed vectors, and vector addition means responsive to said vector generators.

13. A Loran automatic craft navigator comprising, means to create voltage inputs representing Loran station base line vectors, means to insert the hyperbolic coordinates of present position and desired destination, means to create vector voltages representing the directions and distances from said Loran stations to said destination and said present position, means to compare said position and destination vector voltages to determine course and distance from said present position to said destination, and automatic pilot means responsive to said comparison means to guide said craft to said destination.

14. A craft computer for a radio hyperbolic navigation system of the type having a plurality of separate transmitting stations comprising means to create voltages representing said station base line vectors, means to insert hyperbolic coordinates of a desired destination, means to generate a first pair of assumed vector voltages representing the direction and distance from one of said stations to said destination and to present craft position, means to generate a second pair of assumed vector voltages representing the direction and distance from a second of said stations and to said destination and present craft positions, means to generate a third pair of assumed vector voltages representing the direction and distance from a third of said stations to said destination and to present craft position, means to obtain the scalar quantities from said vector quantities, means to obtain the differences between said scalar quantities corresponding to the hyperbolic coordinates of said destination and said present position, means to compare said scalar differences with said inserted hyperbolic coordinates of said destination and said present position, means responsive to the sum and difference of said comparison outputs to correct said vector quantities, means to compare said position and destination vector quantities to determine course and distance from present position to destination.

15. A craft computer for a radio hyperbolic navigation system of the type having a plurality of separate transmitting stations comprising means to create voltages representing said station base line vectors, data input means to insert hyperbolic coordinate data of a desired destination, means to store said data, means to insert present position hyperbolic coordinates through said data input means, means to generate a first pair of vector voltages representing the direction and distance from one of said stations to said destination and to present craft position, means to generate a second pair of vector voltages representing the direction and distance from a second of said stations and to said destination and present craft position, means to obtain scalar quantities from said vector quantities, comparison means to obtain the differences between said scalar quantities corresponding to the hyperbolic coordinates of said destination and said present position, means to obtain the sum and difference of said comparison errors, means responsive to said sum and difference comparison errors to correct said vector quantities.

16. A Loran computer comprising means to insert Loran station position data, means to insert hyperbolic coordinate data of destination and present position, means to compute vector voltages representing the direction and distance from each of said stations to said destination, rectifier means to obtain the scalar differences between pairs of said three vectors, means to compare said scalar differences with said inserted hyperbolic coordinates, means to obtain the sum and difference of said comparison, and servo means responsive to said sum and difference comparison means to correct said vector quantities.

17. A craft computer for a radio hyperbolic navigation system of the type having a plurality of separate transmitting stations comprising input means to insert voltages representing said station base line vectors, means to insert voltages representing a fix at a desired destination, means to generate a destination vector voltage representing the direction and distance from one of said stations to said destination, means to generate a second vector voltage representing the direction and distance from a second of said stations to said destination, means to generate a third vector voltage representing the direction and distance from a third of said stations to said destination, means to obtain scalar quantities from said three vector quantities, means to obtain the differences between said first and second and said second and third scalar quantities, means to compare said differences with said inserted voltages representing a fix at said destination, means responsive to said comparison means to correct said destination vector quantity, means to insert voltages representing a fix at present craft position, means to generate a position vector representing the direction and distance from said one station to said craft position, means to correct said position vector, means to compare said corrected position vector and said corrected destination vector to thereby determine the direction and distance from said position to said destination and automatic pilot means responsive to said comparison means to steer said craft to said destination.

18. A computer for a radio hyperbolic navigation system of the type having a plurality of separate transmitting stations comprising means to create voltages representing said station base line vectors, means to insert voltages representing a fix at a desired destination, means to generate assumed destination vector voltages representing the direction and distance from said stations to said destination, means for converting said assumed destination vector voltages to voltages representing time differences correlated to a fix in terms of hyperbolic coordinates, means for comparing said inserted and said converted destination fix voltages to obtain the sum and difference of said comparisons and means to correct said vectors in response to said sum and difference comparisons.

19. A coordinate computer comprising means to insert voltages representing the coordinates of craft position and destination; means to store said destination coordinate signals, means to generate assumed position vectors representing the direction and distance from a reference station to said craft position and destination; means to correct said assumed vectors, comprising means to compute the voltages representing the navigational coordinates of said assumed vectors, means to compare said assumed and said inserted coordinate signals and means to converge said assumed and inserted values to a null.

20. In a hyperbolic navigation system of the type utilizing a plurality of transmitting stations, craft first computer means to convert input hyperbolic coordinate distance difference quantity into a first voltage having amplitude approximately proportional to the assumed distance from one transmitting station to craft position, and second computer means to convert said input hyperbolic coordinate distance difference quantity into a second voltage proportional in amplitude to the difference between said distance difference and said first voltage component.

21. In a hyperbolic navigation system of the type utilizing a plurality of transmitting stations, craft first computer means to convert each input hyperbolic coordinate distance differing quantity into a first voltage having amplitude approximately proportional to the assumed distance from one transmitting station to craft position, second computer means to convert said input hyperbolic coordinate distance difference of quantity into a second voltage component proportional in amplitude to the difference between said distance difference and said first voltage component, means to generate a voltage representing said assumed distance, means to compare said first voltage with said assumed distance voltage, and means responsive to said comparison means to correct any error in amplitude in the first voltage.

22. In a hyperbolic navigation system of the type utilizing a plurality of transmitting stations, craft first computer means to convert input hyperbolic coordinate distance difference quantities into a first voltage having amplitude approximately proportional to the assumed distance from one transmitting station to craft position, second computer means to convert said input hyperbolic coordinate distance difference quantity into a second voltage proportional in amplitude to the difference between said distance difference and said first voltage component, means to generate assumed voltages representing the assumed distances from first to second transmitting stations to said craft position, means to compare said second voltage with said assumed second voltage quantity from said second station, and means responsive to said comparison means to reduce the errors of said assumed voltages substantially to zero.

23. Means for establishing assumed alternating current voltage analogues of the vector distances from reference stations to the present craft position and to a distination, means for rectifying said voltages, means for taking the differences in said voltages to obtain direct current voltages proportional to the coordinates of said vector voltages, means to compare said obtained coordinates with received Loran coordinates, and means for comparing said vector voltages representing present position with said voltages representing said destination to obtain the desired great circle course as the vector difference between the vector to the present position and a vector to the desired destination.

24. In a navigational computer first and second means for respectively inserting signals representative of a destination and a present position in terms of navigational system coordinates, means connected to said first and second input means for establishing an alternating voltage representing the vector from present position to destination, means for indicating changes in course with respect to said vector and means for indicating the length of said vector to provide distance to go information, and automatic pilot means for controlling a craft in accordance with changes in course with respect to said vector.

25. In a navigational computer first and second means for respectively inserting signals representative of a destination and a present position in terms of navigational system coordinates, means connected to said input means for establishing alternating voltage representing the vector from present position to destination comprising means for generating a first alternating voltage representing a vector from a first reference point to present position, means for generating a second alternating voltage representing a vector from said reference point to the destination and means connected to said two generating means for taking the difference between said vectors to determine a third vector from present position to destination.

26. In a navigational computer first and second means for respectively inserting signals representative of a destination and a present position in terms of navigational system coordinates, and computer means connected to said first and second input means for establishing an alternating voltage representing the vector from present position to destination.

27. In a navigational computer first and second means for respectively inserting signals representative of a destination and a present position in terms of navigational system coordinates, computer means connected to said first and second input means for establishing an alternating voltage representing the vector from present position to destination, means for indicating changes in course with respect to said vector, and means for indicating the length of said vector to provide distance to destination.

28. Means to generate an alternating current signal representing a vector quantity, the amplitude and phase of said signal being respectively proportional to the quantity and direction of said vector, means to generate a signal representing the loci of positions between a first pair of known points, means to generate a signal representing the loci of positions between a second pair of known points, means for determining the sum and difference of said two last-named signals, means responsive to the sum signal for adjusting the amplitude of said vectorial signal, and means responsive to the difference signal for adjusting the phase of said vectorial signal, whereby said vectorial signal represents a vector from a known origin to the positional fix established by said loci.

29. Means to generate an alternating current signal representing a vector quantity, the amplitude and phase of said signal being respectively proportional to the quantity and direction of said vector, means to receive signals from a first pair of known points, means to generate a signal representing the time difference between transmission and reception of said first pair of signals, means to receive signals from a second pair of known points, means to generate a signal representing the time difference between transmission and reception of said second pair of signals, means for determining the sum and difference of said time difference signals, means responsive to said sum of said time difference signals to adjust the amplitude of said vectorial signal, means responsive to the difference of said time difference signals to adjust the phase of said vectorial signal, whereby said vectorial signal represents a vector from a known origin to the positional fix established by said first and second time difference loci.

30. Apparatus for use in radio position finding systems to assist in the navigation of a mobile craft to any selected position, which apparatus comprises means for providing a pair of outputs representative of intersecting radio position lines defining the location of the craft, manually settable means for providing a pair of outputs representative of intersecting radio position lines defining the selected future position, and means jointly responsive to all four of said outputs for continuously indicating the progress of said craft as it approaches said future position.

31. Apparatus for use in radio position finding systems of the hyperbolic type in order to assist in the navigation of a mobile craft to any selected future position, which apparatus comprises means for providing a pair of outputs respectively representative of hyperbolic coordinates passing through the location of the craft, manually settable means for providing a pair of signals respectively representative of hyperbolic coordinates passing through said selected future position, and means jointly responsive to all four of said outputs for continuously indicating the progress of said craft as it moves towards said selected future position.

References Cited in the file of this patent

UNITED STATES PATENTS

| | | |
|---|---|---|
| 1,854,391 | Avery | Apr. 19, 1932 |
| 1,985,265 | Smith | Dec. 25, 1934 |
| 2,427,463 | Kemperer et al. | Sept. 19, 1947 |
| 2,472,129 | Streeter | June 30, 1949 |
| 2,530,428 | Gray | Nov. 21, 1950 |
| 2,539,616 | Gehman | Jan. 30, 1951 |
| 2,541,277 | Omberg et al. | Feb. 13, 1951 |
| 2,551,211 | Hawking et al. | May 1, 1951 |
| 2,554,760 | Wallace | May 29, 1951 |
| 2,581,438 | Palmer | Jan. 8, 1952 |
| 2,582,588 | Fennessy et al. | Jan. 15, 1952 |
| 2,600,159 | Ergen | June 10, 1952 |
| 2,613,339 | Palmer | Oct. 7, 1952 |

FOREIGN PATENTS

| | | |
|---|---|---|
| 626,966 | Great Britain | July 25, 1949 |

OTHER REFERENCES

Course Line Computer New Navigational Aid; Aero Digest; November 1950; pp. 70, 79 to 83.

Electronic Instruments, Greenwood et al., M.I.T. Radiation Lab. Serial, volume 21, McGraw-Hill, 1948; pp. 190 to 212.